US010797279B2

(12) United States Patent
Tanner et al.

(10) Patent No.: US 10,797,279 B2
(45) Date of Patent: Oct. 6, 2020

(54) BATTERY HOUSING SYSTEMS

(71) Applicant: Caterpillar Inc., Deerfield, IL (US)

(72) Inventors: John M. Tanner, Dunlap, IL (US);
Jeffrey T. Michielutti, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 77 days.

(21) Appl. No.: 16/022,087

(22) Filed: Jun. 28, 2018

(65) Prior Publication Data

US 2020/0006722 A1   Jan. 2, 2020

(51) Int. Cl.
| | |
|---|---|
| *H01M 2/10* | (2006.01) |
| *H01M 10/6557* | (2014.01) |
| *H01M 10/6568* | (2014.01) |
| *H01M 2/02* | (2006.01) |
| *H01M 10/42* | (2006.01) |
| *H01M 2/26* | (2006.01) |
| *H01M 10/613* | (2014.01) |

(52) U.S. Cl.
CPC ....... *H01M 2/1016* (2013.01); *H01M 2/0285* (2013.01); *H01M 2/26* (2013.01); *H01M 10/425* (2013.01); *H01M 10/4207* (2013.01); *H01M 10/613* (2015.04); *H01M 10/6557* (2015.04); *H01M 10/6568* (2015.04); *H01M 2010/4271* (2013.01)

(58) Field of Classification Search
None
See application file for complete search history.

(56) References Cited

U.S. PATENT DOCUMENTS

| | | | | |
|---|---|---|---|---|
| 6,117,587 A | * | 9/2000 | Kitami | H01M 2/1005 294/158 |
| 9,166,207 B2 | | 10/2015 | Fujimura | |
| 9,321,337 B2 | | 4/2016 | Wang et al. | |
| 9,761,919 B2 | | 9/2017 | Lane et al. | |
| 2011/0258845 A1 | * | 10/2011 | Wells | H01M 2/1077 29/623.1 |
| 2011/0293974 A1 | * | 12/2011 | Yoon | H01M 2/1083 429/72 |
| 2012/0177971 A1 | * | 7/2012 | Cicero | H01M 10/6556 429/120 |
| 2012/0298433 A1 | * | 11/2012 | Ohkura | H01M 10/6555 180/65.1 |
| 2014/0220391 A1 | * | 8/2014 | Fujii | B60L 50/66 429/7 |

(Continued)

FOREIGN PATENT DOCUMENTS

CN   106992273 A   7/2017

OTHER PUBLICATIONS

David W. Cooke, Design of a Lithium Ion Battery Pack for 400 MPH Electric Landspeed Racing, 2012, 115 pages.

*Primary Examiner* — Scott J. Chmielecki
(74) *Attorney, Agent, or Firm* — Bookoff McAndrews

(57) ABSTRACT

A battery module may include a housing having a length, a width, and a height. The housing may include four sidewalls, a first open end, and a second open end opposite the first open end. The four sidewalls may extend the length of the housing. The four sidewalls may form a seamless closed channel member. A plurality of battery cells may be stacked lengthwise within the housing. A first endplate may be coupled to the first open end of the housing, and a second endplate may be coupled to the second open end of the housing.

20 Claims, 4 Drawing Sheets

(56) References Cited

U.S. PATENT DOCUMENTS

| | | | | |
|---|---|---|---|---|
| 2014/0242436 A1* | 8/2014 | Pyzza | ................ | H05K 7/20436 |
| | | | | 429/120 |
| 2014/0295220 A1* | 10/2014 | Mori | ................ | H01M 10/625 |
| | | | | 429/53 |
| 2016/0104873 A1* | 4/2016 | Smythe | ................ | H01M 2/202 |
| | | | | 429/56 |
| 2016/0126514 A1* | 5/2016 | Suzuki | ................ | H01M 10/613 |
| | | | | 429/120 |
| 2016/0164149 A1* | 6/2016 | Hodge | ................ | H01M 2/024 |
| | | | | 429/120 |
| 2016/0211559 A1* | 7/2016 | Frohnmayer | ..... | H01M 10/6556 |
| 2016/0329538 A1* | 11/2016 | Hughes | ............... | H01M 2/1072 |
| 2017/0098873 A1* | 4/2017 | Tsuchiya | ................ | H01G 11/74 |
| 2017/0179553 A1* | 6/2017 | Guena | ................ | H01M 10/613 |
| 2017/0222285 A1 | 8/2017 | Li et al. | | |
| 2017/0346146 A1* | 11/2017 | Kim | ................ | H01M 10/6568 |
| 2018/0108891 A1* | 4/2018 | Fees | ................ | B60L 50/66 |
| 2018/0123191 A1* | 5/2018 | Dudley | ................ | H01M 2/024 |
| 2018/0138466 A1* | 5/2018 | Fees | ................ | H01M 2/0245 |
| 2018/0151927 A1* | 5/2018 | An | ................ | H01M 10/656 |
| 2018/0281617 A1* | 10/2018 | Newman | ............ | H01M 10/486 |
| 2018/0287112 A1* | 10/2018 | Juventin | ................ | H01G 11/82 |
| 2018/0337375 A1* | 11/2018 | Kellner | ............ | H01M 10/6556 |
| 2018/0337384 A1* | 11/2018 | Volinski | ................ | H01M 2/206 |
| 2019/0006643 A1* | 1/2019 | Sakurai | ................ | H01M 2/1077 |
| 2019/0013500 A1* | 1/2019 | Sakurai | ............ | H01M 10/0486 |
| 2019/0115638 A1* | 4/2019 | Chen | ................ | H01M 10/613 |

* cited by examiner

BATTERY HOUSING SYSTEMS

TECHNICAL FIELD

The present disclosure relates generally to battery housing systems, and more particularly to housing configurations for battery modules and a battery packs.

BACKGROUND

Mobile machines may be powered by batteries to operate or propel the machines. Such mobile machines may use a plurality of batteries to supply energy to motors in order to drive the vehicle, e.g., by rotating wheels or tracks of the machine. The batteries may include battery cells contained in a battery module. A plurality of battery modules may be arranged into a battery pack. Because the batteries modules are stored on the vehicle, increasing the power density, power per unit of volume, of the battery modules or battery pack may increase the efficiency of the vehicle. The power density may be increased by reducing the size footprint of the battery modules and battery packs.

During operation, the battery modules may need to protect the battery cells from the environment, e.g., water, debris, vibrations, or other hazards. The battery cells, and battery modules, may also require cooling to discharge heat generated by charging and discharging. Thus, increasing the power density of the battery modules may be difficult to balance with the other required characteristics of the battery modules or battery pack.

U.S. Patent Publication No. 2016/0104873 ("the '873 publication") discloses a battery module formed by joining together a number of sidewalls to enclose a plurality of battery cells. Two or more of the battery modules may be attached to one another to form the battery pack. While the battery module and battery pack of the '873 publication provides a certain level of performance, each may be improved.

The battery module and battery pack of the present disclosure may solve one or more of the problems set forth above and/or other problems in the art. The current scope of the disclosure, however, is defined by the attached claims and not by the ability to solve any specific problem.

SUMMARY OF THE DISCLOSURE

According to one aspect of the present disclosure, a battery module may include a housing having a length, a width, and a height. The housing may include four sidewalls, a first open end, and a second open end opposite the first open end. The four sidewalls may extend the length of the housing. The four sidewalls may form a seamless closed channel member. A plurality of battery cells may be stacked lengthwise within the housing. A first endplate may be coupled to the first open end of the housing, and a second endplate may be coupled to the second open end of the housing.

According to another aspect of the present disclosure, a battery module may include a housing having a length, a width, and a height, with the length being longer than the width and the height. The housing may further include four sidewalls, a first open end, and a second open end opposite the first open end. The four sidewalls may extend the length of the housing and form a seamless closed channel member. The four sidewalls may include a first sidewall and a second sidewall opposite one another. Each of the first sidewall and the second sidewall may include a plurality of protrusions. All of the protrusions may be offset between the first sidewall and the second sidewall. The four sidewalls may further include a third sidewall and a fourth sidewall opposite one another. The third sidewall and the fourth sidewall may each include an approximately flat outer surface. The battery module may include a plurality of battery cells stacked lengthwise within the housing. The battery module may include a first endplate coupled to the first open end of the housing, and a second endplate coupled to the second open end of the housing.

According to yet another aspect of the present disclosure, a battery pack may include a pack, having a front side and a back side, and a plurality of support members configured to receive a plurality of battery modules. The battery modules may include a housing having a length, a width, and a height. The housing may further include four sidewalls, a first open end, and a second open end opposite the first open end. The four sidewalls may extend the length of the housing and form a single, continuous, seamless member. The battery modules may further include a plurality of battery cells stacked lengthwise within the housing. The battery modules may include a first endplate coupled to the first open end of the housing, and a second endplate coupled to the second open end of the housing. The battery pack may further include cooling conduits located between the battery modules and structurally separate from the battery modules.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±10% in a stated value or characteristic.

Figure 1:
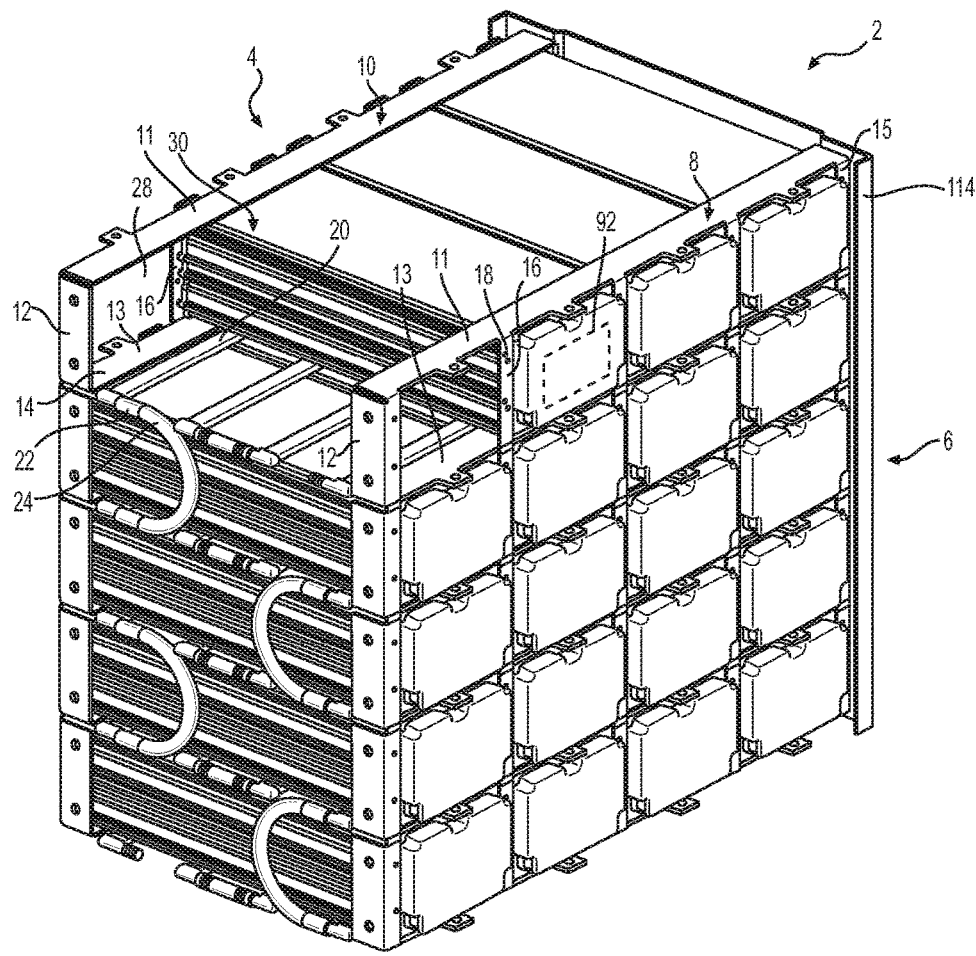
FIG. 1 illustrates a perspective view of a battery pack, according to an aspect of the present disclosure.

FIG. 1 illustrates a battery pack 2 according to an aspect of the present disclosure. The battery pack 2 may have a front side 4 and a back side 6, each formed by a plurality of stacked support members or support brackets, such as, e.g., support brackets 8 and 10. The front side 4 and the back side 6 may be configured to receive a plurality of battery modules 30. For example, the front side 4 and the back side 6 may include a plurality of stalls or slots or openings 28 formed by the support brackets 8 and 10, each opening 28 shaped to receive a battery module 30. In some examples, the battery module 30 may be placed in the battery pack 2 by sliding the battery module 30 through an opening 28 in the front side 4 or the back side 6. In at least one example, the battery pack 2 is assembled around the battery module 30. In some examples, the battery pack 2 may arrange the battery modules 30 in a plurality of rows and/or columns. The battery modules 30 may be arranged to form an array, e.g., a rectangular array. The configuration of battery modules 30 shown in FIG. 1 is not exclusive, and additional configurations, arrays, and arrangements of the battery modules 30 within the battery pack 2 are also contemplated.

A row of battery modules 30 may be formed by positioning individual battery modules 30 within support members or brackets 8 and 10. As shown in FIG. 1, each bracket 8, 10 may include further support members, for example, a pair of parallel longitudinal bracket sections 11, 13, a pair of parallel bracket end sections 12, 15, and a plurality of bracket separator sections 16 extending between the longitudinal bracket sections 11, 13. Rows of battery modules 30 (five rows shown in FIG. 1) may be stacked together and secured by a pair of end brackets 114 (only one end bracket 114 is not shown in FIG. 1 for clarity). The end brackets 114 may be secured to the rows of battery modules 30 via openings in the bracket end sections 12, 15. It is that the brackets 8, 10 could be configured to include more or less battery modules 30 in each row, and more or less rows could be combined to form the battery pack 2.

The battery pack 2 may include a cooling system including a plurality of cooling conduits 20 containing a coolant. The coolant may flow through the cooling conduits 20 to remove heat released from the battery modules 30 during operation (e.g., charging or discharging). As shown in FIG. 1, the cooling conduits 20 may be structurally separated from the battery modules 30 so that coolant does not contact the battery modules 30. Separating the battery modules 30 from the cooling conduits 20 may help to reduce the risk of coolant contacting or contaminating the inside of battery modules 30.

The cooling conduits 20 may be adjacent to one or more surfaces of a battery module 30 to exchange heat with the battery module 30. As will be described in more detail below, the surface of the battery module 30 adjacent to the cooling conduits 20 may be approximately flat. The cooling conduits 20 may be located between two battery modules 30. For example, the cooling conduits 20 may be positioned between rows of battery modules 30. In at least one example, cooling conduits 20 are positioned adjacent to each row of battery modules 30 in the battery pack 2.

The cooling conduits 20 may be arranged approximately orthogonal to a length of the battery module 30 and/or along a row of battery modules 30. The cooling conduits 20 may be spaced along the battery modules 30. For example, the cooling conduits 20 may be arranged so that each cooling conduit 20 contacts each battery module 30 at spaced (non-adjacent) positions on a surface of the battery module 30. The cooling conduits 20 of one row may be connected to another row one or more tubes 24 and fittings 22. The cooling system may also include any other conventional cooling system components (not shown), such as a pump, temperature sensors, heat exchanger, condenser, evaporator, and/or turbine, etc.

Figure 2:
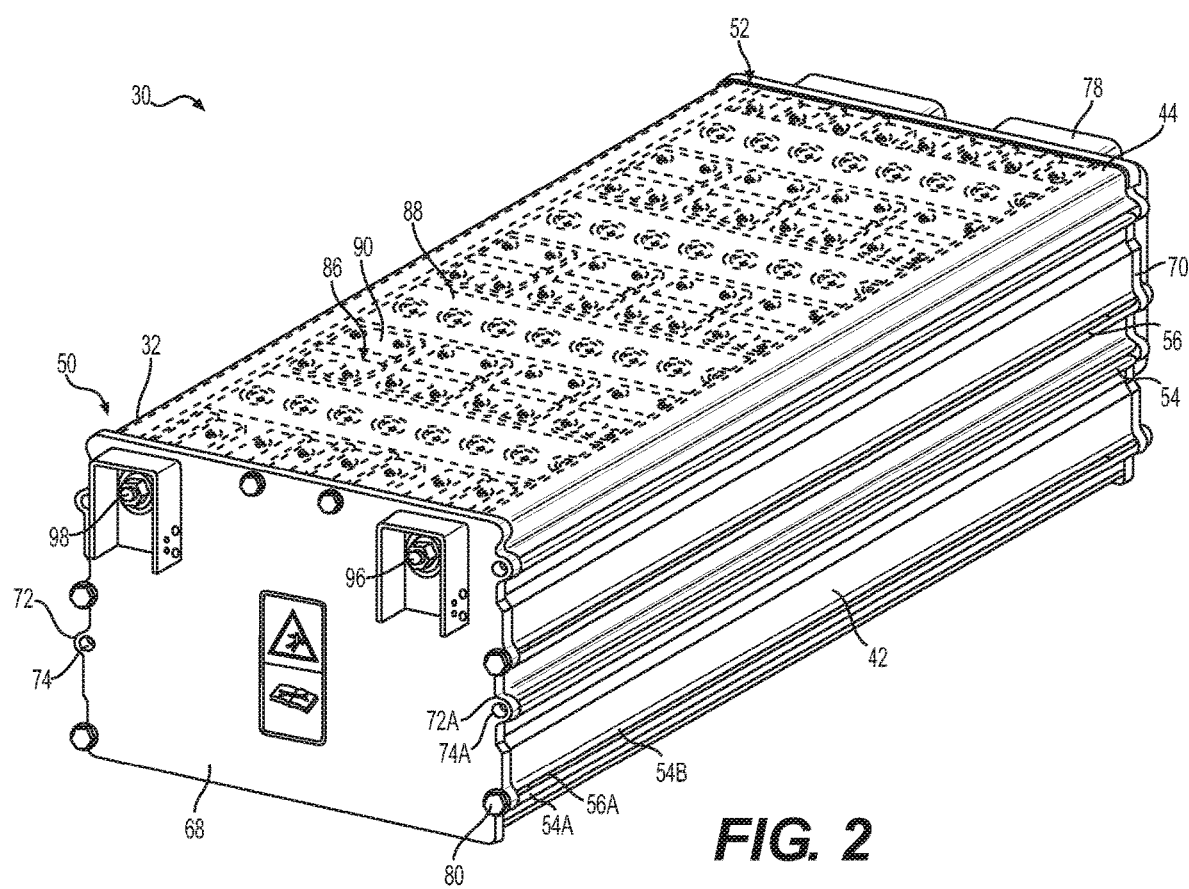
FIG. 2 illustrates a perspective view of an exemplary battery module contained in the battery pack of FIG. 1.
Figure 3:
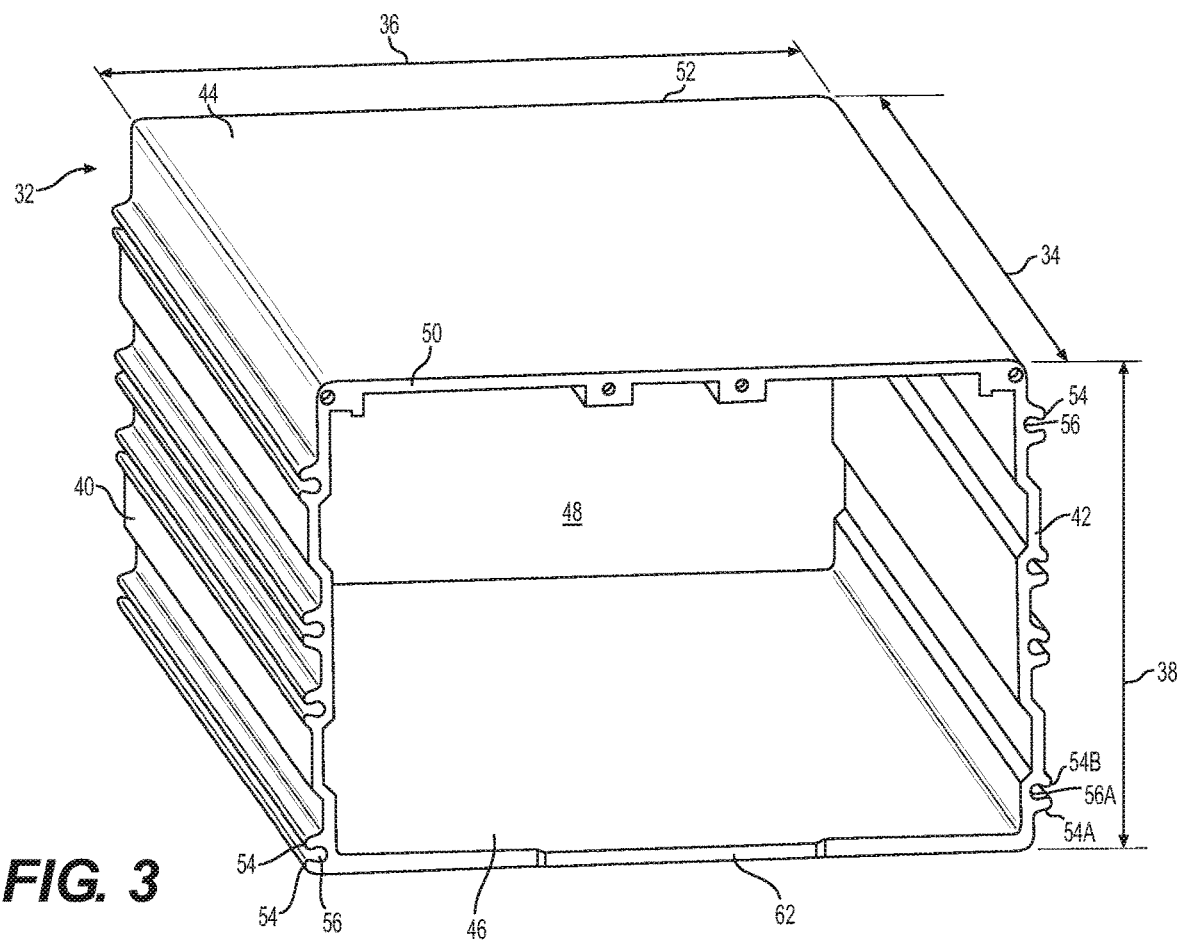
FIG. 3 illustrates a perspective view of a housing of the battery module of FIG. 2.

With reference to FIGS. 2 and 3, an exemplary battery module 30 includes a housing 32 and endplates 68, 70. As will be described more below, the interior of the battery module 30 may include a plurality of battery cells, bus bars, and connectors (shown in dashed lines in FIG. 2). As shown in FIG. 3, the housing 32 of battery module 30 has a length 34, a width 36, and a height 38. The length 34 of the housing 32 may be longer than the width 34 and/or the height 36. The housing 32 may include a first open end 50 and a second open end 52. The housing 32 may include one or more sidewalls, such as, e.g., four sidewalls. The four sidewalls may extend the length of the housing 34 forming a closed channel member. A first sidewall 40 may be opposite a second sidewall 42, and a third sidewall 44 may be opposite a fourth sidewall 46. It should be appreciated that although FIGS. 2 and 3 illustrate a housing 32 having four sidewalls forming a generally rectangular shape, alternative embodiments including any number of sidewalls or shapes are also considered.

The housing 32 may be an extruded, unitary member manufactured using extrusion methods known in the art. The housing 32 may be seamless, e.g., without welding, fusing, or otherwise connecting the sidewalls 40, 42, 44, and 46. The housing 32 may be extruded metal, such as, e.g., aluminum or an aluminum alloy. Other suitable metals, metal alloys, and materials known in the art may also be extruded to form the housing 32. The sidewalls 40, 42, 44, and 46 may define an interior space 48 within the housing 32 in which a number of components of the battery module 30 are disposed.

As noted above and shown in dashed lines in FIG. 2, a plurality of battery cells 86 may be contained within the interior space 48 of the housing 32. The battery cells 86 may be lithium ion battery cells, or any other electrochemical cells known in the art. Each battery cell 86 may have a length, a width, and a height. The length may be shorter than the width and height of the battery cell 86. The battery cells 86 may be stacked forming a row lengthwise within the housing 32. That is, the battery cells 86 may be arranged within the housing 32 so that the length of each of the battery cells 86 is aligned with the length 34 of the housing 32. The battery cells 86 may be arranged in rows. Two or more battery cells 86 may be electrically and/or physically connected by a bus bar 90. In some examples, each row of battery cells 86 may be physically attached to one another by a retaining member 88. In at least one example, the battery cells 86 are connected physically and/or electronically and then positioned within the housing 32.

Further, the battery cells 86 may be at least partially enclosed by insulation (not shown). For example, an insulating material may surround at least part of each battery cell 86 so that the battery cells 86 are separated from one another. Additionally, the battery module 30 may include one or more insulating elements positioned between the housing 32 and the battery cells 86.

Enclosing the interior space 48 of the housing 32 at the first and second open ends 50, 52 may be a first endplate 68 and a second endplate 70. The first endplate 68 and/or second endplate 70 may be substantially transverse to (e.g., orthogonal to) the length 34 of the housing 32. In some examples, the endplates 68, 70 may be sized larger than the open ends 50, 52 of the housing 32. For example, an perimeter of the first endplate 68 may extend beyond a perimeter of the first open end 50 of the housing 32.

The first endplate 68 and the second endplate 70 may each include a plurality of flanges 72. One or more of the flanges 72 may include an opening 74. In some examples, the first endplate 68 and/or the second endplate 70 are coupled to the housing 32 by one or more fasteners 80 passing through the openings 74 on the flanges 72 and into housing 32. The fastener 80 may be any suitable fastener 80 known in the art, such as, e.g., a bolt, screw, or rivet. With reference to FIGS. 1 and 2, a fastener 80 may extend through a hole 18 in a bracket separator section 16 of a bracket 8, 10 in the battery pack 2 and secure onto the battery module 30. For example, certain holes 18 of the battery pack 2 may align with openings 74 in the first and/or second endplate 68, 70 of each the plurality of battery modules 30 to receive the fastener 80. The fasteners 80 may also couple the battery pack 2 to a sidewall of the battery module 30, as described below.

A seal member (not shown) may be disposed between the first endplate 68 and the first open end 50. Additionally or alternatively, a seal member may be disposed between the second endplate 70 and the second open end 52. Exemplary seal members may include rubber, urethane, silicone, and any other suitable materials known in the art. The seal member may provide a planar fluid tight seal between the housing 32 and the first endplate 68 and/or second plate 70. For example, the battery module 30 may be waterproof and/or water resistant.

In some examples, the battery module 30 includes a circuit board 92 and a controller (not shown) operably connected to one or more of the battery cells 86, e.g., via a bus bar 90. The controller may be a processor, e.g., a microprocessor. The controller and one or more components, e.g., sensors, may be operably mounted on the circuit board 92, such as, for example, a printed circuit board (PCB) (as shown in FIG. 1). The circuit board 92 may be coupled to an endplate of the battery module 30, e.g., the second endplate 70. The battery module 30 may include a cover element 78 attached to the housing 32 and/or an endplate to enclose the circuit board 92. One or more connections, e.g., wires (not shown), may pass through the second endplate to connect the battery cells 86 to the circuit board 92 and thus the controller. The controller may control or operate at least a portion of the plurality of battery cells 86 as known in the art, such as, for example, changing the operation of the battery cells 86 based on a temperature of the battery module 30 measured by one or more sensors.

Referring back to FIG. 2, the battery module 30 includes a positive terminal 96 and a negative terminal 98 electrically connected to the battery cells 86. In some aspects of the present disclosure, the positive terminal 96 and the negative terminal 98 may extend from within the housing 32 through an endplate, e.g., the first endplate 68. The positive and negative terminals 96, 98 may include a protective member 94, as shown in FIG. 4.

Turning to FIG. 3, an exemplary housing 32 may have a substantially rectangular cross-section. According to some embodiments, the housing 32 may have other cross-sections, such as, for example, substantially polygonal. According to some examples, the cross-sectional shape of the housing 32 may be substantially constant along the length 34 of the housing 32. The third sidewall 44 and the fourth sidewall 46 may include an approximately flat outer surface. The housing 32 may include a tab 62, extending from the first open side 50 of the housing 32. The first endplate 68 (and seal member) may include a complementary recess (not shown) configured to receive the tab 62. The tab 62 may be shaped or tapered to align the first endplate 68 with the housing 32. The second open side 52 and endplate 70 may also include a tab and complementary recess, respectively, in the same manner as open side 50 and endplate 68.

One or more of the sidewalls of the housing 32 may include one or more protrusions 54. The protrusions 54 may extend from the housing 32 at an angle. In some examples, a protrusion 54 may be curved. In some examples, two protrusions 54 may curve toward one another. Two protrusions 54 may define an opening or groove 56 between them, such as, e.g., an open or closed opening. For example, groove 56A is formed between protrusion 54A and protrusion 54B. The protrusions 54 may form grooves 56 along the length housing 34, e.g., along a length of the first sidewall 40 and/or the second sidewall 42. The grooves 56 may be configured to receive a fastener 80. In some examples, the fastener 80 may create an interference fit within the groove 56. In some examples, the fastener 80 may include threads complimentary to threads formed within the groove 56. As best shown in bottom corner of FIG. 2, the fastener 80 may extend through an opening 74 in an endplate, e.g., the first endplate 68, and secure within a groove 56 aligned with the opening 74. The fastener 80 may attach the first endplate 68 or the second endplate 70 to the housing 32 with a seal member disposed between the housing and the endplate. For example, a fastener 80 may be configured to be received in the groove 56 to thereby retain the first endplate 68 to the housing 32 with a seal member (not shown) compressed between the housing 32 and the first endplate 68. As mentioned above, the fastener 80 may secure the housing 32 to the battery pack 2, e.g., by passing through a hole 18 in a bracket separator section 16 of a support bracket 8, 10 (shown in FIG. 1) and securing within a groove 56. While the protrusions 54 are shown as forming a groove, it is understood that other arrangements are possible, such as a single closed protrusion forming a cylindrical passage or tube along the length 34 of the housing 32.

Figure 4:
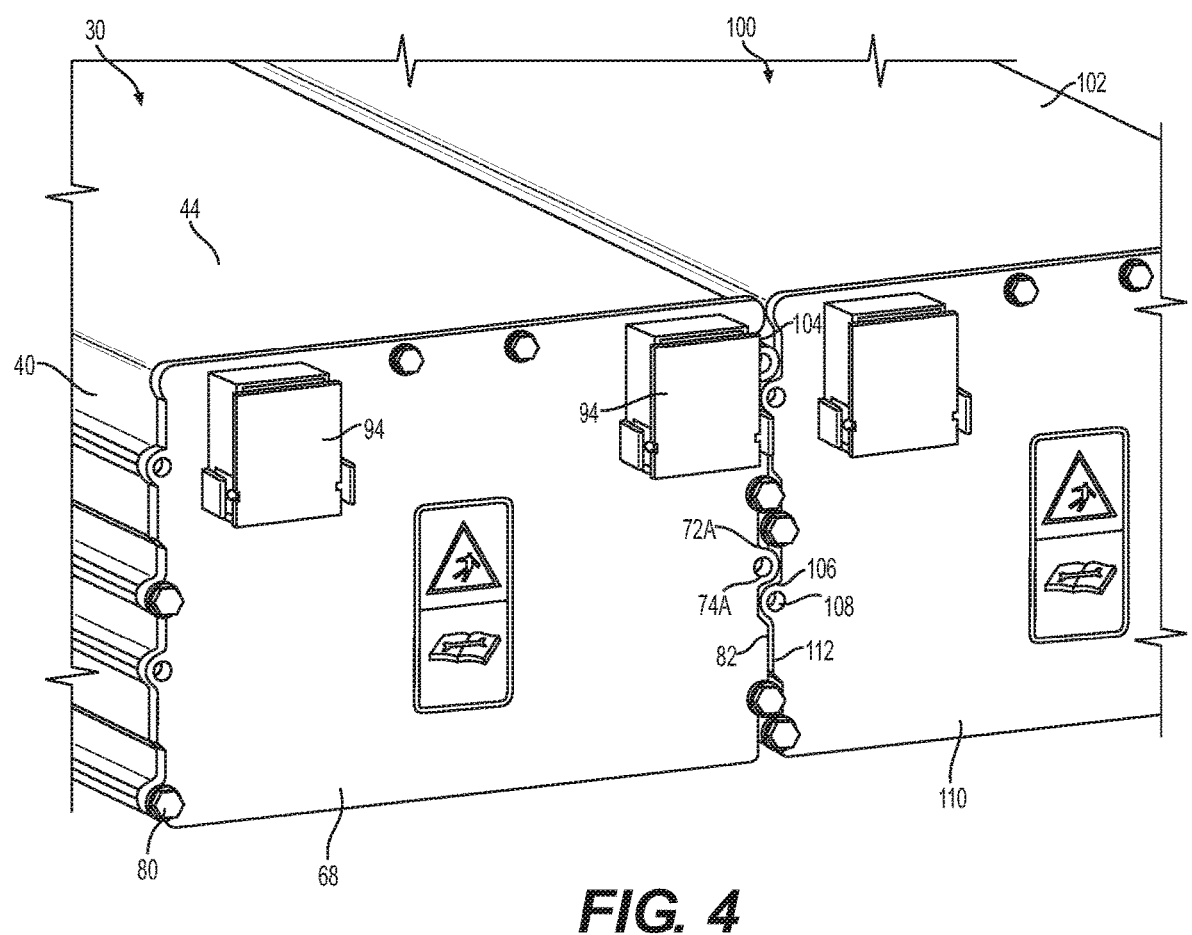
FIG. 4 illustrates a manner of arranging the battery module of FIG. 2 to interleave with an identical second battery module.

FIGS. 3 and 4 illustrates a manner in which the battery module 30 may be arranged adjacent to a substantially identical second battery module 100. The battery module 30 may be configured to interleave with an identical second battery module 100. For example, the first sidewall 40 of the battery module 30 may be shaped complimentary to the second sidewall 42 of battery module 30, and the first sidewall 40 may be identical to a first side wall 104 of the second battery module 100 so that the second sidewall 42 of the battery module 30 may interleave with the first sidewall 104 of the second battery module 100. As used herein, interleaved or complementary arrangements includes the protrusions 54 of the first sidewall 40 and the protrusions of the second wall 42 do not align, but are rather offset, e.g., along the height 38 of the housing 32, so that the protrusions 54 do not interfere with one another when two identical battery modules 30 are placed side by side. The endplates of each battery module 30 may be configured to be arranged adjacent to one another. For example, a side surface 82 of the first endplate 68 coupled to the battery module 30 may be shaped to align with a side surface 112 of an identical first endplate 110 coupled to the second battery module 100. The flanges 72 of the endplates 68, 70, may be offset. For example, flange 72A, including opening 74A, of the first endplate 68 of the battery module 30 may arranged adjacent, e.g., along the height 38 of the housing 32, to flange 106, including opening 108, of an identical first endplate 110 of the second battery module 100. The battery module 30 and the second battery module 100 may be arranged adjacent to one another so that the third surface 44 is approximately coplanar with a third surface 102 of the second battery module 100. Additionally, or alternatively, the battery modules 30 may be configured to be stacked upon one another, e.g., the battery module 30 may be placed on top of an outer surface of the third sidewall 102 of the second battery module 100. As shown in FIG. 1, the battery module 30 may be arranged to interleave with an identical battery module 30 when positioned within the battery pack 2, or separate from the battery pack 2.

INDUSTRIAL APPLICABILITY

The present disclosure finds potential application with applications in machines where electric energy is required. The battery module of the present disclosure is particularly applicable to vehicles where power density may be significant. The battery module 30 may protect the battery cells 86 and components from vibration, corrosion, inadvertent impact, fluid damage, and contaminants during operation of the machines or vehicles. The battery rack 2 may provide a compact arrangement of a plurality of battery modules 30, and provide for a structurally separate cooling system to cool the battery modules 30. The integral, unitary, seamless housing 32 of the battery module may limit the number of potential leakage points, and reduce the sophistication of sealing the battery module by avoiding, for example, a three seam intersection of the housing 32 and endplates 68, 70 of the battery module 30. Further, the structurally separate cooling system can help avoid coolant leaks affecting the interior components of the battery pack 30. Additionally, the arrangement of the battery modules 30 in the battery pack 2 may reduce the overall size of the battery pack 2. As a result, the durability and efficiency of a machine, e.g., a vehicle may be assisted by implementing the battery module 30 or the battery pack 2 according to the present disclosure.

It will be apparent to those skilled in the art that various modifications and variations can be made to the disclosed device without departing from the scope of the disclosure. Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A battery module pack comprising:
a cooling device including a conduit; and
a plurality of battery modules each including:
   a housing having a length, a width, and a height,
   the housing further including four sidewalls, a first open end, and a second open end opposite the first open end, the four sidewalls extending the length of the housing and forming a seamless closed channel member, wherein at least two of the sidewalls include a flat exterior surface for engaging the cooling device;
   a plurality of battery cells stacked lengthwise within the housing;
   a first endplate coupled to the first open end of the housing; and
   a second endplate coupled to the second open end of the housing;
wherein the plurality of battery modules are stacked atop one another with the flat exterior surface of each battery module disposed over or underneath the flat exterior surface of another battery module; and
wherein the conduit is positioned between the plurality of battery modules along the at least two sidewalls such that the flat exterior surfaces of adjacent battery modules are separated from one another by the conduit.

2. The battery module pack of claim 1, including a plurality of protrusions extending from a first sidewall and a second sidewall.

3. The battery module pack of claim 2, further including an opening formed between two of the plurality of protrusions extending from the first sidewall, and wherein the opening is aligned with an opening in the first endplate.

4. A battery module pack comprising:
a cooling device including a conduit; and
a plurality of battery modules suspended over one another in a plurality of rows, wherein the cooling device is interwoven between the plurality of battery modules such that the conduit is positioned between each of the plurality of rows, wherein each battery module includes:
   a housing having a length, a width, and a height, with the length being longer than the width and the height;
   the housing further including four sidewalls, a first open end, and a second open end opposite the first open end, the four sidewalls extending the length of the housing and forming a seamless closed channel member,
   the four sidewalls including a first sidewall and a second sidewall opposite one another and each including a plurality of protrusions, with all of the protrusions being offset between the first sidewall and the second sidewall, wherein the plurality of protrusions extend along an exterior of the first sidewall and the second sidewall to form one or more grooves for receiving a fastener, and
   the four sidewalls further including a third sidewall and a fourth sidewall opposite one another and each including an approximately flat outer surface;
   a plurality of battery cells stacked lengthwise within the housing;
   a first endplate coupled to the first open end of the housing by the fastener; and
   a second endplate coupled to the second open end of the housing by the fastener.

5. The battery module pack of claim 4, wherein the first sidewall of the battery module is configured to interleave with a second sidewall of an identical battery module.

6. The battery module pack of claim 4, wherein the plurality of protrusions of the first sidewall and the second sidewall each form a plurality of openings.

7. The battery module pack of claim 6, wherein each of the plurality of openings is configured to receive a fastener, and wherein the first endplate and the second endplate are each coupled to the housing by one or more fasteners.

8. The battery module pack of claim 4, wherein the plurality of protrusions extend along the entire length of the housing.

9. The battery module pack of claim 4, including a circuit board mounted on an outer surface of the second endplate, and a cover member coupled to the second endplate around the circuit board, wherein the circuit board includes a controller and the circuit board is operably connected to each of the plurality of battery cells, and wherein the controller is configured to control at least a portion of the plurality of battery cells.

10. The battery module pack of claim 4, including a tab extending from the first open end of the housing, the first endplate including a recess shaped to receive the tab.

11. A battery module pack comprising,
a pack, having a front side and a back side, and a plurality of support members configured to receive a plurality of battery modules, wherein the battery modules are suspended by the plurality of support members in a stacked arrangement forming at least two rows of battery modules, each of the battery modules including,
   a housing having a length, a width, and a height,
   the housing further including four sidewalls, a first open end, and a second open end opposite the first open end, the four sidewalls extending the length of the housing and forming a single, continuous, seamless member, wherein at least two of the four sidewalls include a planar exterior surface;

a plurality of battery cells stacked lengthwise within the housing, a first endplate coupled to the first open end of the housing, and a second endplate coupled to the second open end of the housing; and cooling conduits suspended by the plurality of support members and located between the at least two rows of battery modules such that the cooling conduits separate a first row of battery modules from a second row of battery modules, wherein the cooling conduits contact the housings of the plurality of battery modules along the planar exterior surface of the at least two sidewalls.

12. The battery module pack of claim 11, wherein the at least two of the four sidewalls including the planar exterior surface are parallel to one another, and wherein the cooling conduits are adjacent to the planar exterior surface of each of the at least two sidewalls.

13. The battery module pack of claim 11, wherein the plurality of support members include fastener openings aligned with openings in the first endplate or the second endplate of the battery modules.

14. The battery module pack of claim 11, wherein the battery modules are arranged in rows, and wherein the cooling conduits are located between the rows of battery modules.

15. The battery module pack of claim 11, wherein the four sidewalls include a first side wall and a second sidewall, and wherein a first sidewall of a first battery module is configured to interleave with a second sidewall of an identical second battery module.

16. The battery module pack of claim 11, wherein the cooling conduits are positioned orthogonal to the length of the housing of the battery modules.

17. The battery module pack of claim 1, wherein the conduit forms a plurality of cooling rows that overlap with one another when positioned between the plurality of battery modules.

18. The battery module pack of claim 17, wherein each of the plurality of cooling rows are separated from one another by the plurality of battery modules positioned therebetween.

19. The battery module pack of claim 1, wherein the conduit is configured to contact a subset of the plurality of battery modules along at least two sidewalls.

20. The battery module pack of claim 1, wherein the conduit is configured to inhibit lateral movement of a subset of the plurality of battery modules.

* * * * *